(12) United States Patent
Schmitt (10) Patent No.: US 7,045,741 B2
(45) Date of Patent: May 16, 2006

(54) ELECTRIC ARC WELDING DEVICE, METHOD OF WELDING METAL SHEETS TO METALLIC COUNTERPIECES, AND WELDING ELEMENT

(75) Inventor: Klaus Gisbert Schmitt, Giessen (DE)

(73) Assignee: Newfrey LLC, Newark, DE (US)

( * ) Notice: Subject to any disclaimer, the term of this patent is extended or adjusted under 35 U.S.C. 154(b) by 223 days.

(21) Appl. No.: 10/703,378

(22) Filed: Nov. 7, 2003

(65) Prior Publication Data

US 2004/0118826 A1    Jun. 24, 2004

(30) Foreign Application Priority Data

Nov. 8, 2002    (DE)    .................. 102 53 415

(51) Int. Cl.
*B23K 9/08*    (2006.01)
(52) U.S. Cl. ........................................ 219/123
(58) Field of Classification Search ................ 219/123, 219/61, 97
See application file for complete search history.

(56) References Cited

U.S. PATENT DOCUMENTS

| | | | | |
|---|---|---|---|---|
| 2,477,582 | A | * | 8/1949 | Dawson ........................ 219/97 |
| 3,352,997 | A | * | 11/1967 | Butler ......................... 219/123 |
| 4,278,868 | A | | 7/1981 | Rudd et al. |
| 4,434,348 | A | * | 2/1984 | Reid ............................. 219/61 |

FOREIGN PATENT DOCUMENTS

| | | |
|---|---|---|
| DE | 44 00 957 | 3/1995 |
| DE | 299 05 259 U | 3/1999 |
| EP | 0053380 A | 6/1982 |
| EP | 1 038 626 A2 | 3/2000 |

OTHER PUBLICATIONS

"Stud Welding Logic", Emhart Tucker, pp. 6, Oct. 2000.
"Bolzenschweissen, Grundlagen und Anwendung", Trillmich Welz, Gachbuchreihe Schweisstechnik, vol. 133, Deutscher Verlag fur Schweisstechnik (DVS-Verlag) GmbH, Ch. 9.4, 1997, with an English Translation, 7 pgs.

\* cited by examiner

*Primary Examiner*—Clifford C. Shaw
(74) *Attorney, Agent, or Firm*—Harness, Dickey & Pierce, P.L.C.

(57) ABSTRACT

An electric arc welding device (10) for butt welding metallic sheets (12; 72; 80; 90; 92; 94; 100) is provided having an elongated face (22) onto metallic counterpieces (14), having a holding device (16; 16, 74) for holding a sheet (12, 72; 80; 90; 92; 94; 100), a reciprocating device (18) for moving the holding device (16; 16, 74) to and fro towards the counterpiece (14) and away from it, and a voltage supply device (20) for applying a voltage between sheet (12; 72; 80; 90; 92; 94; 100) and counterpiece (14) in order to generate an electric arc (24) between them. A magnetic field generating device (30) is provided, designed to generate a magnetic field (50, 32) having a component (32) transverse to the extent of the elongated face (22) and transverse to the extent of the electric arc (24) generated in the welding operation, in order to move the electric arc (24) in the direction of the extent of the elongated face (22).

20 Claims, 4 Drawing Sheets

ELECTRIC ARC WELDING DEVICE, METHOD OF WELDING METAL SHEETS TO METALLIC COUNTERPIECES, AND WELDING ELEMENT

CROSS-REFERENCE TO RELATED APPLICATIONS

This application claims the benefit of German Patent Application DE 102 53 415.2, filed Nov. 8, 2002. The disclosure of the above application is incorporated herein by reference.

FIELD OF THE INVENTION

The present invention relates to an electric arc welding device for butt welding of metallic sheets having an elongated face to metallic counterpieces, having a holding device for holding a sheet, a reciprocating device for moving the holding device to and fro towards and away from the counterpiece, and a voltage supply device for applying a voltage between sheet and counterpiece, in order to produce an electric arc between them.

Further, the present invention relates to a method of butt welding metallic sheets having an elongated face to metallic counterpieces, a voltage being applied between the sheet and the counterpiece, an electric arc being set up between the sheet and the counterpiece by means of which the face of the sheet and the facing part of the counterpiece are incipiently fused, and the sheet being finally butt-connected to the counterpiece to produce a welded seam.

Lastly, the present invention relates to a welding element of a metallic material for welding to a metallic counterpiece by the process of electric arc welding, having a welding segment to be welded onto the counterpiece and an erect functional segment performing a certain function on the counterpiece, for example for the fastening of objects to the counterpiece, the welding segment comprising an elongated face whose contour is generally adapted to the contour of the counterpiece.

BACKGROUND OF THE INVENTION

Such an electric arc welding device, such a welding method and such a welding element are known as the present applicant's WELDFAST welding system. In the field of electric arc welding, also known as short-time arc welding or bolt welding, it is known that bolts of various shapes may be welded onto counterpieces in the form of areal metal sheets. Here, the bolts serve as fastening elements, as a rule for plastic clips, which perform a certain function on the counterpiece. As an example, mention may be made of the manufacture of motor vehicle bodies, onto which nowadays many such welding bolts are welded, for the purpose of afterwards fastening lines thereto by means of the plastic clips, fixing internal trim to the body sheet-metal, etc.

Further, it is known that metal nuts may be welded onto metal sheets. Here, the sheets often comprise a hole beforehand, oriented concentrically with an internal thread of the nut, so that objects may be fixed to the sheet by means of screws. When welding nuts onto body sheet-metal, as a rule use is made of a magnetic field so controlled that an electric arc set up between the nut and the counterpiece is moved circularly along the face of the nut. Here, the welding device comprises a coil around the location of the welds, effecting a rotation of the arc on the circular annulus surface of the nut. This is described for example in *Bolzenschweissen, Grundlagen und Anwendung* by Trillmich Welz, *Fachbuchreihe Schweisstechnik*, Vol. 133, *Deutscher Verlag für Schweisstechnik* (DVS-Verlag) GmbH, 1997, Ch. 9.4. A corresponding device is also disclosed, for example, in DE 4,400,957 C1.

For the joining of sheet-metal fastening elements to large-area sheet metal parts, for example bodywork sheets, it is known that a welding segment may be bent off on the fastening element in question, to be placed parallel on the bodywork sheet. The connection is then made by spot welding. A disadvantage here is that a relatively large mass of the sheet metal of the fastening element is required for the welding segment to be laid parallel on the body sheet-metal. With the use of numerous such fastening elements in a motor vehicle, the weight of the vehicle is increased sharply.

To solve this problem, the applicant for the present invention has proposed the so-called WELDFAST welding process. By the WELDFAST welding process, fastening elements in the form of small plates are butt-welded onto a counterplate. This eliminates the parallel fastening segment required in spot welding technology, so that a considerable saving of weight is achieved.

The WELDFAST welding system is often employed for the purpose of butt welding small welding elements in the form of sheet metal parts onto a real counterpieces. A typical example of an application is the production of motor vehicle bodies, where such welding elements are welded onto body parts, and later perform a certain function, for example for laying fuel lines, as anchors for trim, etc. Here, the welding elements comprise a welding segment having an elongated face. Their contour is generally adapted to the contour of the counterpiece.

To facilitate ignition of the electric arc, the contour of the face is often configured tapering at an obtuse angle, departing from the contour of the counterpiece. The electric arc is then set on the counterpiece with the obtuse tip by the reciprocating method of ignition. Then a bias current is applied in order to draw an electric arc from the counterpiece when the welding element is lifted. Then, the welding current is switched on, typically in the neighborhood of up to two thousand amperes, in order to produce an electric arc extending over the entire elongated face of the welding element. Then the welding element is lowered onto the counterpiece, causing the melt formed by the arc to mingle. The welding current is switched off and the welded seam cools out.

The energy required to produce such a welded connection is substantial. Printed source DE 299 05 259 U1 discloses the equipping of a welding device for the WELDFAST welding system with field formers to produce a magnetic field acting upon the electric arc, the latter consisting partly of a soft-magnetic steel. The field formers, according to an example, are provided at the end of the sheet metal, and each encircles it in U-shaped fashion. According to another example, field formers are provided that are arranged parallel with the sheet metal. In both cases, the field formers are to set up a magnetic field acting on the electric arc, the field former thus influencing the spread of the arc. How the electric arc is influenced and how the magnetic field is oriented, however, is not to be learned from this source.

SUMMARY OF THE INVENTION

The problem to which the invention is addressed, consequently, consists in specifying an improved electric arc welding means for butt welding of metallic sheets having an elongated face onto metallic objects, a corresponding welding method, and a welding element for such a welding process.

This object is accomplished, in the case of the electric arc welding device initially mentioned, in that a magnetic field generating device is provided, designed to generate a magnetic field having a component transverse to the extent of the elongated face and transverse to the extent of the electric arc set up in the welding operation, in order to move the electric arc in the direction of extent of the elongated face.

In the case of the welding method initially mentioned, the above problem is solved in that a magnetic field generating device generates a magnetic field having a component transverse to the extent of the elongated face and transverse to the extent of the electric arc, in order to move the electric arc in the direction of the extent of the elongated face, so that the electric arc travels along the face.

In the case of the welding element initially mentioned, the above problem is solved in that the contour of the elongated face is so configured at least at one of its ends so that a welding operation with magnetic arc deflection, can be derived from the voltage of the arc set up in the welding operation, as soon as the arc has reached the end by means of the magnetic arc deflection.

By the measure of providing a magnetic field generating device of the kind described in the electric arc welding device according to the invention, it is possible to fuse the face of the sheet metal and the facing part of the counterpiece with an electric arc that moves along the elongated face. Contrary to the prior art according to the WELDFAST system, in the electric arc welding device according to the invention a locally limited electric arc is set up, traveling along the extent of the face for incipient fusion of the face and the counterpiece. Here, an electric arc of lower energy may be employed, not extending simultaneously over the entire length of the face like the WELDFAST arc, but locally limited as stated. In order nevertheless to fuse the entire face and counterpiece incipiently, the arc is moved along the face by means of the magnetic arc deflection.

By virtue of the fact that the magnetic field has a component manifesting itself transverse to the extent of the elongated face and transverse to the extent of the arc, a Lorentz force is exerted on the arc, causing it to travel along the face.

The arc set up by the electric arc welding device according to the invention may possess a lower energy than in the known WELDFAST system. Hence, welding operations generally can be carried out with lower energy outlay. Also, it is possible to weld the sheets onto counterpieces in the form of thinner plates, since there is less danger of burning these plates through in the neighborhood of the welded seam.

For the welding element according to the invention, it is of advantage that the configuration of the contour of the elongated face, at least at one of the ends, can be determined, namely by means of the voltage of the electric arc, as soon as the arc has reached that end. Consequently it is possible, through the configuration of the welding element, either to switch off the arc or cause it to travel in the opposed direction when it reaches the end of the elongated face.

Thus, in the electric arc welding device according to the invention, it is of advantage if a control device is provided designed to reverse the polarity of the magnetic field, so that the electric arc can be moved in both directions of extent of the elongated face. In this way, by means of the control device, the arc can be moved to and fro along the elongated face, in order to fuse the face and counterpiece incipiently.

The energy outlay required for the welding operation may be minimized still further thereby, since the arc need not exert the total melting energy in the course of a single motion along the face. Rather, this can be accomplished by at least one forward and at least one return motion, but as a rule several forward and return motions.

Likewise, it is an advantage if the magnetic field generating device is designed to generate the magnetic field substantially over the total length of the face. Thus, the electric arc can be moved over the entire length of the face, and if necessary moved back.

According to another preferred embodiment, the magnetic field generating device comprises at least one coil connected to a magnetic circuit comprising an air gap in the neighborhood of the welded seam to be formed, between which the sheet metal is introducible by its face. In this way, the magnetic field can be produced in comparatively simple manner with the component transverse to the extent of the elongated face and transverse to the extent of the electric arc. Here, it is of especial advantage if the magnetic circuit comprises two yokes arranged parallel to the extent of the face of the sheet metal and defining the air gap between them.

Thus, it is possible to arrange the coil to advantage spatially. The magnetic field relevant to guidance of the electric arc is set up between the yokes. The shape of the yokes may optionally be adapted to the shape of the sheet metal, for example if the latter comprises jags and/or is of undulant configuration in lengthwise direction.

According to another preferred embodiment, the coil is wound on a core arranged more or less parallel to the sheet metal, with two yoke legs extending from it towards the sheet metal, the magnetic circuit further comprising a counteryoke on the opposed side of the sheet metal, comprising two legs matching the yoke legs and a connection piece connecting them.

The magnetic circuit is consequently formed by the core, the two yoke legs extended from it, and the counteryoke, two air gaps being arranged in between. The one air gap is the one located in the neighborhood of the welded seam to be formed. The other air gap is necessarily arranged above this air gap.

By this configuration, a magnetic field may be produced in a simple design with a component transverse to the extent of the elongated face and transverse to the extent of the electric arc. Here, it is preferred if an additional coil is arranged on the counteryoke. Thus, the magnetic field strength can be enhanced in the air gap associated with the welded seam. Upon the whole, it is of advantage if, when the sheet metal comprises a ferromagnetic material, the holding device comprise a non-ferromagnetic holding element, arranged during the welding operation in an air gap of a magnetic circuit by means of which the magnetic field is produced.

Especially, in the preferred embodiment of the magnetic circuit as described above, the holding element of non-ferromagnetic material may then be arranged in the upper air gap, so that a short circuit of the magnetic circuit by way of the sheet metal to be welded on is avoided.

According to a further preferred embodiment, the welding current passing through the electric arc, depending on the width of the element to be welded, lies within a range smaller than the welding current needed to cover the entire width of the fastening element, and may for example be reduced as far as 200 A.

In the case of an electric arc of this intensity, upon the whole a lower energy consumption in the welding operation will result. In addition, the sheet metal may also be butt welded to thin countersheets.

In the method according to the invention, it is preferred if the polarization of the magnetic field is reversed when the electric arc reaches the end of the face, in order to move the electric arc in the opposed direction. This makes it possible to move the electric arc to and fro at the face. Here, it is of especial advantage if the electric arc voltage is monitored and if a pole-reversing operation is initiated when it appears from the electric arc voltage that the arc has reached the end of the face.

It has been found that the arc, especially with suitable configuration of the contour at the end of the metal sheet or welding element to be welded on, is deflected from the face of the sheet towards the counterpiece beyond the extent of the face, so that the length of the arc is enlarged. This increases the arc voltage. Suitable electronics can monitor this, and utilize it to initiate the operation of pole reversal.

Alternatively, it is possible to initiate the operation of pole reversal on the basis of other parameters, for example by time control. Here, one must fall back on suitable experience, when the electric arc has reached the end of the face under certain boundary conditions. Of course, it is also possible to recognize the arrival at the end of the face by providing suitable sensors, for example optical or magnetic sensors, in the neighborhood of the end of the face.

Also, it is of especial advantage over all if the sheet metal and/or counterpiece surfaces to be welded are cleaned by means of an electric arc moved along these surfaces by means of the magnetic field, carrying a current whose magnitude is smaller than that of a welding current. The electric arc cleaning current is so chosen that the face of the sheet metal and the counterpiece are not yet incipiently fused, but rather the joining zone is cleared of surface coatings and soilage. In this way, at small welding current, extremely low-sputter welds can be produced.

It will be understood that the features above mentioned and yet to be illustrated below may be employed not only in the specified combinations but also in other combinations or alone, without departing from the scope of the present invention.

BRIEF DESCRIPTION OF THE DRAWINGS

Embodiments of the invention are represented by way of example in the drawings, and will be illustrated in more detail in the description to follow. In the drawings.

DETAILED DESCRIPTION OF THE PREFERRED EMBODIMENTS

Figure 1:
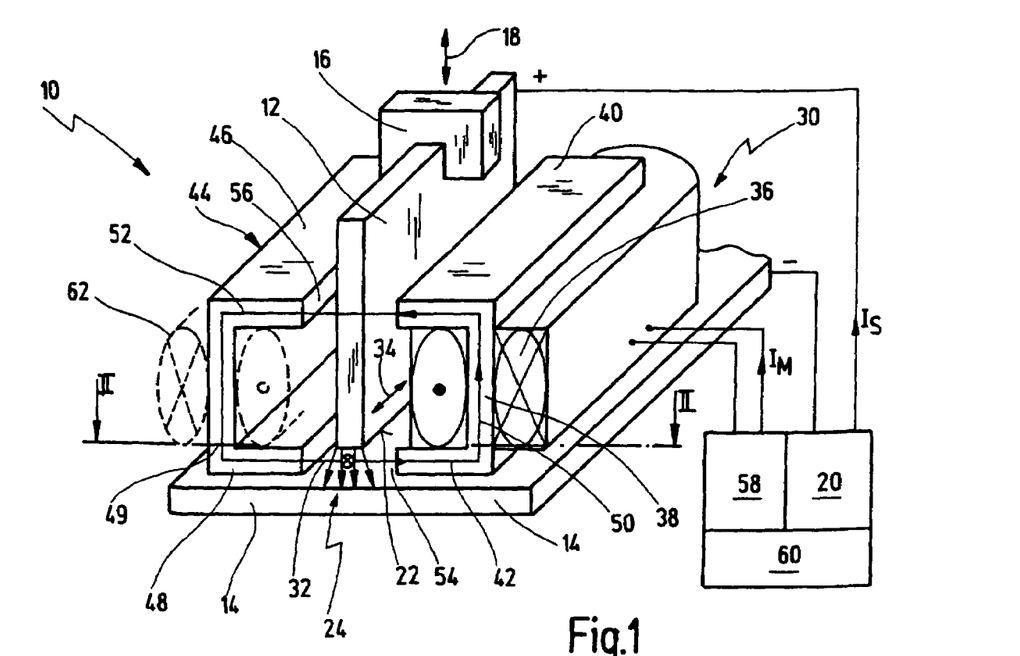
FIG. 1 is a schematic perspective view of a first embodiment of the electric arc welding device according to the invention.
Figure 2A:
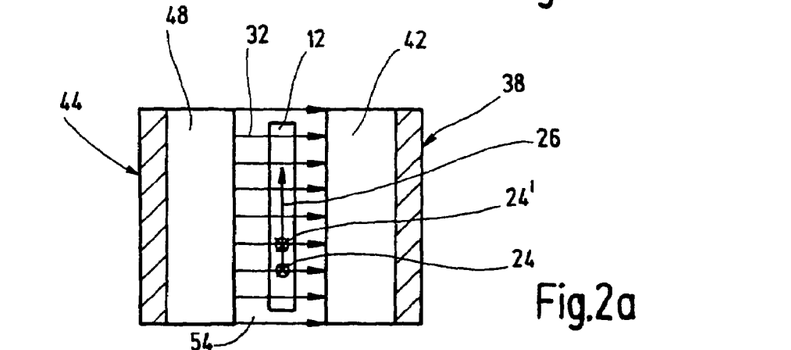
FIG. 2a is a schematic representation of the welding device of FIG. 1 seen from above, a magnetic field being set up in the joining zone by means of a magnetic field generating device, so that an electric arc will wander in one direction.
Figure 2B:
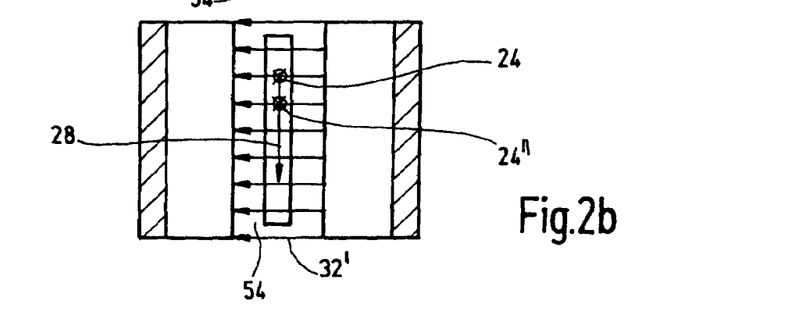
FIG. 2b is a schematic representation similar to FIG. 2a, in which the polarity of the magnetic field is reversed, so that the electric arc will wander in the other direction.

In FIGS. 1 and 2, a first embodiment of an electric arc welding device according to the invention is generally designated 10. The electric arc welding device (hereinafter, the welding device) serves to butt weld a welding element in the form of an elongated sheet or sheet segment 12 of metal onto a counterpiece in the form of a countersheet 14, for example a body sheet of a motor vehicle.

The welding device 10 comprises a holding device 16 to hold the sheet 12. A schematically indicated reciprocating device 18 serves to move the holding device 16 with sheet 12 to and fro, namely towards the counterpiece 14 and away from the counterpiece 14. A voltage supply device 20 serves to apply an electric voltage from sheet 12 to counterpiece 14.

The welding device 10 shown operates by the so-called reciprocating ignition process. That is, a face 22 of sheet 12, facing the counterpiece 14, is lowered to butt against the counterpiece 14, generally arranged transverse or perpendicular thereto. Then the voltage supply device 20 is switched to a pre-current, and then the sheet 12 is lifted off from the counterpiece 14 by means of the reciprocating device 18, drawing an electric arc 24. Alternatively, the welding device may operate with peak ignition.

For welding, the voltage of the voltage supply device 20 is raised, so that a welding current $I_S$ will flow by way of the electric arc 24, suitable for incipiently fusing the face 22 and the facing part of the counterpiece 14 locally. The arc 24 thereby formed is locally limited, i.e. it does not extend over the entire face 22 of the sheets 12. Typical values of the welding current lie below 500 A, in particular below 400 A. In many applications, a welding current $I_S$ of 300 A is sufficient.

The locally limited or local arc 24 is then moved, as may be seen in FIG. 2, along the face 22 of the sheet 12, first in a first direction 26 and then in a second direction 28, oriented opposed to the first direction 26. This is shown in FIG. 2a by the schematically indicated arcs 24, 24', and in FIG. 2b by the schematically indicated arcs 24, 24". To move the arc 24 along the face 22 of the sheet 12, a magnetic field generating device generally designated 30 in FIG. 1 is employed.

The magnetic field generating device 30 generates a magnetic field in the neighborhood of the welding zone, having a component 32 firstly passing transverse to the lengthwise extent 34 of the face 22 and secondly transverse to the extent of the arc 24, which generally passes from the face 22 more or less perpendicularly towards the counterpiece 14.

Owing to this magnetic field component 32, a Lorentz force acts on the arc 24, moving the arc in the direction of the extent of the face 22. In FIG. 2a, it is shown that the electric arc moves in the first direction 26 for a magnetic field component 32. In FIG. 2b, it is shown that the arc 24 is moved in the opposed second direction 28 by a magnetic field component 32', opposed to the magnetic field component 32.

The magnetic field is generated by means of a coil 36 wound on a magnetic core extending generally parallel to the sheet 12. From the core 38, an upper yoke leg 40 extends towards the sheet 12. A lower yoke leg 42 extends towards the sheet 12 in the neighborhood of the welding zone.

The magnetic field generating device further comprises a counteryoke 44. The counteryoke 44 is configured more or less in mirror image to the arrangement of core 38 and upper and lower yoke legs 40, 42, and comprises an upper leg 46, a lower leg 48, and a connection piece 49 connecting the legs 46, 48. By this arrangement, a magnetic circuit 52 is prepared, carrying the magnetic field 50, carried from the core 38 by way of the upper yoke leg 40, an upper air gap 56, the upper leg 46, the connection piece 49, the lower leg 48, a lower air gap 54, and by way of the lower yoke leg 42.

The sheet 12, for a welding operation, is introduced by way of the upper gap 56 towards the lower gap 54, so that the face 22 lies more or less above the lower gap 54. Here, the component 32 of the magnetic field 50 acts by way of the entire lengthwise extent 34 of the face 22, thus moving the arc 24. It will be understood that the sheet 12 in the embodiment represented should be of a non-ferromagnetic material, since otherwise there is danger that the magnetic circuit 52 may be short-circuited by way of the sheet 12.

For the coil 36, an additional voltage supply device 58 is provided, designed to generate a coil current $I_M$. A control device 60 is provided that triggers the voltage supply device 20 for the welding current $I_S$ and the voltage supply 58 for the coil current $I_M$. Here, the control device 60 is designed in particular to reverse the poles of the voltage supply device 58 at appropriate points in time. Hence, the arc 24, as soon as it has reached an end of the face 22 in the course of a motion along the face 22, can be moved back in the opposed direction.

The pole reversal of the magnetic field 50 may for example be time controlled, or by means of suitable sensors (not shown in FIG. 1) designed to detect the position of the arc 24 from time to time. By way of a regulating circuit provided in the control device 60, the poles of the magnetic field 50 are then reversed. At 62, an optional additional coil is shown, which may be provided on connection piece 49 to intensify the magnetic field 50.

Figures 3, 4, 5:
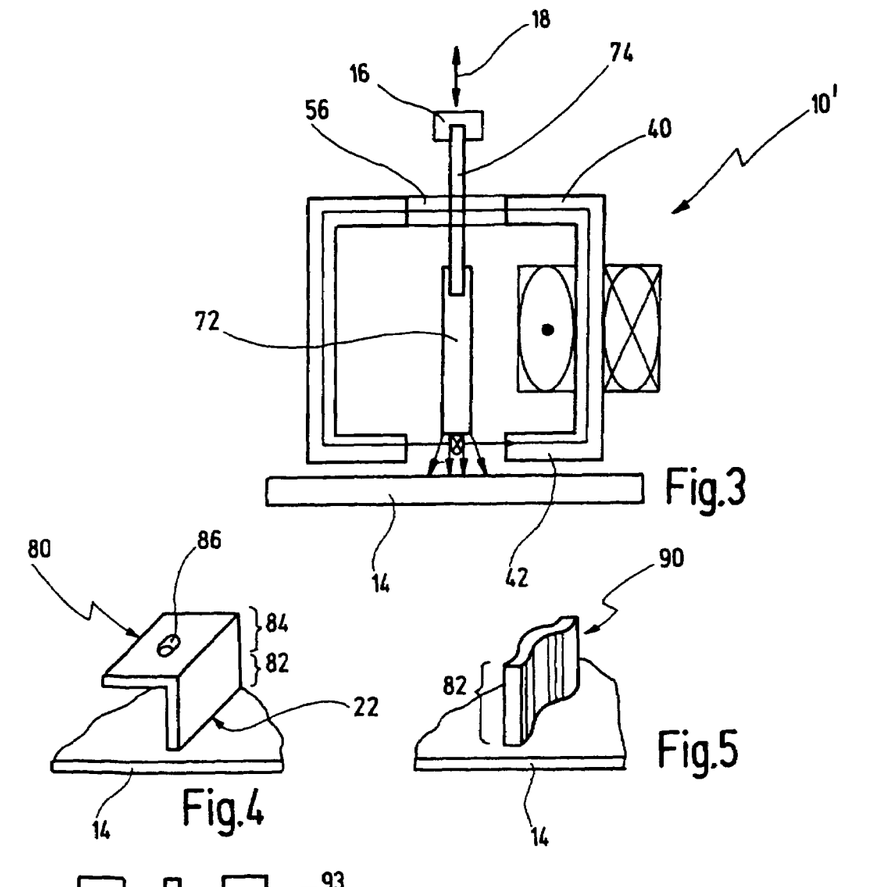
FIG. 3 is a side view of the face of another embodiment of the electric arc welding device according to the invention, having a holding device comprising a non-ferromagnetic holding element.
FIG. 4 is a perspective schematic view of a typical welding element.
FIG. 5 is a perspective schematic view of another embodiment of a welding element according to the invention.

In FIG. 3, 10' generally designates a modified embodiment of the welding device 10 of FIGS. 1 and 2. The general structure of the welding device 10' is identical to that of the welding device 10. Unlike the latter, the welding device 10' comprises a holding element 74 of non-ferromagnetic material, designed to hold a ferromagnetic sheet 72. If the ferromagnetic sheet 72 is introduced into the magnetic field generating device 30, the non-ferromagnetic holding element 74 lies at the level of the upper air gap 56. This will avoid a short circuit from the upper yoke leg 40 to the lower yoke leg 42 by way of the ferromagnetic sheet 72. In this embodiment, the holding device 16 is designed to hold the holding element 74.

The welding device according to the invention is designed to butt weld sheets of any shape onto counterpieces (countersheets) arranged transverse, in particular more or less perpendicular, thereto. The welding device may in particular be employed in the field of building bodies for motor vehicles. In that field, often fairly small sheet metal parts are welded to the body sheet metal. The smaller sheet metal parts serve as fastening parts, or anchors for fastening parts. A typical example of such a sheet or sheet metal element is shown at 80 in FIG. 4. The sheet 80 comprises a welding segment 82, oriented more or less perpendicular to the counterpiece 14 and having a face 22 whose contour is more or less adapted to the contour of the counterpiece 14.

Above the welding segment 82, the sheet 80 comprises a functional segment 84. The functional segment 84 may have a largely arbitrary shape, and, in the present case, is configured as a sheet metal segment bent L-shaped, in which a fastening hole 86 is provided. To the fastening hole 86 in the further course of production of the motor vehicle, any parts may be fastened, for example internal trim, electric or fuel lines, to mention only a couple of examples.

FIG. 5 shows the welding segment 82 of another sheet 90, suitable for welding onto a counterpiece 14. The welding segment 82 of the sheet 90 is of corrugated configuration throughout, in lengthwise direction, that is, more or less parallel to the face 22. In welded-on condition, this results in a higher bending strength with respect to forces acting perpendicularly on the broad side of the sheet 90. The corresponding functional segment 84 is not represented in FIG. 5. As in the embodiment of FIG. 4, it may be of any shape.

Figure 6:
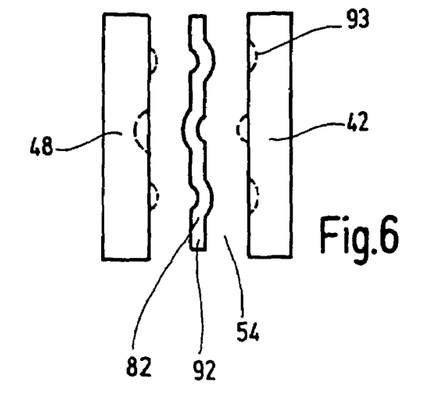
FIG. 6 is a schematic top view of another embodiment of a welding element according to the invention, with associated yokes of the magnetic field generating device.

FIG. 6 shows an additional embodiment of a sheet 92 configured over its long side with jags extending alternately in different directions, likewise enhancing the bending strength. FIG. 6 shows further that in this embodiment, the lower yoke leg 42 and the lower yoke leg 48 may be provided with a contour 93 corresponding to the shape of the sheet 92, that is, with recesses and projections matching the jag. While this may not be thought necessary in many cases, it nevertheless serves to produce a more homogeneous influencing of the arc 24.

Generally speaking, the shape of the yokes forming the air gap 54 can be adapted to the shape of the welding segment 82. In particular, it is possible to standardize the welding segment 82 to a large extent, and to provide sheets with different functional segments 84 for different fastening purposes.

Figure 7:
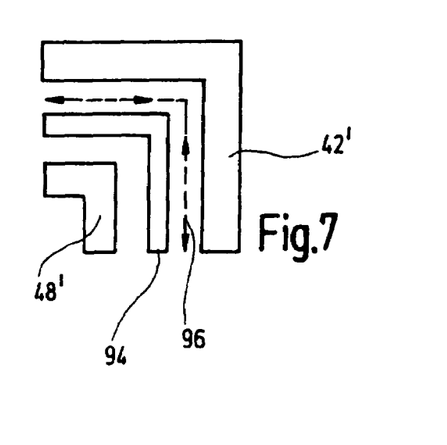
FIG. 7 is a schematic top view of still another embodiment of a welding element according to the invention, with associated yokes of the magnetic field generating device.

FIG. 7 shows an embodiment having a sheet 94 bent at an angle in top view. In corresponding conformation, the yoke elements 42', 48' are likewise of angled configuration, so that the arc traverses an angled path 96.

Figure 8:
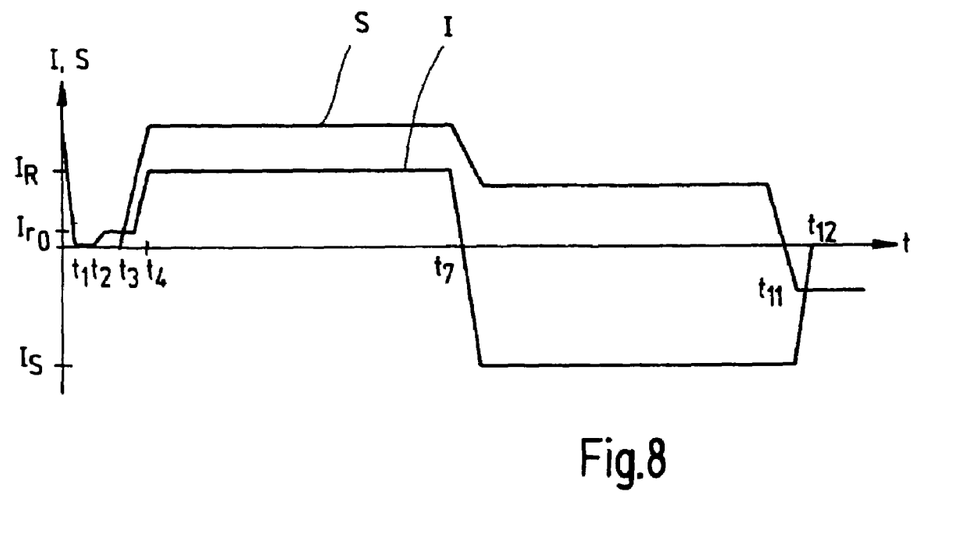
FIG. 8 is a graph of the path of the welding element as a function of time, as well as the welding current during a welding operation.
Figure 9:
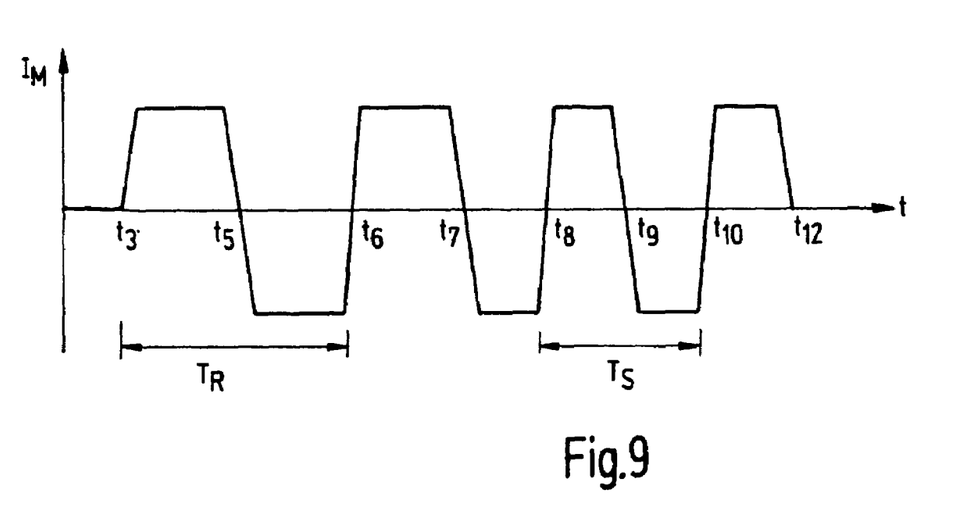
FIG. 9 is a graph corresponding to FIG. 8, as a function of time, of a current through a coil of the magnetic field generating device.

FIGS. 8 and 9 show a typical welding operation with the welding device 10 as a function of time. FIG. 8 shows the current 1 made available by the voltage supply device 20 and the stroke S of the reciprocating device 18 as functions of time. FIG. 9 shows the current $I_M$ made available by the voltage supply device 58 as a function of time.

At a time $t_1$, first the sheet 12 is lowered by its face 22 onto the counterpiece 14. This position is fixed in FIG. 8 as the zero position. At $t_2$, a pre-current $I_v$ is then switched on, suitable for drawing an electric arc 24. Then at $t_3$ the sheet 12 is lifted off from the counterpiece 14 and the arc 24 is drawn. At $t_4$, a so-called cleaning current $I_R$ is set, higher than the pre-current.

The cleaning current $I_R$ is suitable for cleaning the surface of the face 22 and the facing surface of the counterpiece 14 of impurities, in particular of surface coating and/or soiling. This kind of process is generally known and is employed by the present applicant under the designation "Cleanflash."

Parallel to the lifting of the sheet 12, at time $t_3$ the magnet current $I_M$ is switched on, so that the electric arc generated is influenced by the magnetic field component 32 and begins right at the start to wander along the face 22. At time $t_5$, the coil current $I_M$ is reversed. At this time, the arc 24 has reached an end of the face 22 and, owing to the pole reversal, then travels in the opposed direction.

At time $t_6$, another pole reversal occurs, so that the face 22 is swept by the arc 24 once more.

At time $t_7$, the sheet approaches the counterpiece somewhat more closely, and the current made available by the voltage supply device 20 is reversed and set to the welding current $I_S$. Simultaneously, the magnetic field component 32 is again reversed by reversing the coil current $I_M$.

The welding current $I_S$ comprises a different polarity than the cleaning current $I_R$ and has a higher absolute value, which, as mentioned above, may lie in the neighborhood of 300 A.

In the further course of time, the arc 24 again reaches the opposed end of the face 22, and the coil current $I_M$ is reversed again. Additional reversals occur at $t_9$ and $t_{10}$, when the electric arc 24 has reached opposed ends of the face 22.

At time $t_{11}$, the face 22 of sheet 12 and the facing portion of the counterpiece 14 are incipiently fused sufficiently, so that the sheet 12 is lowered to butt against the counterpiece 14. Here the sheet 12 is lowered to a position below the above-mentioned zero position, to achieve a good mingling of the melts and ultimately a good welded connection. Simultaneously or shortly thereafter, at time $t_{12}$, welding current $I_S$ and coil current $I_M$ are switched off.

The melts cool, and a butt welded connection is formed between the sheet 12 and the counterpiece 14. It will be understood that the above description of the welding of the sheet 12 onto the counterpiece 14 applies in exactly the same way to the above-mentioned sheets 80, 90, 92 and 94.

It may be seen in FIG. 9 that the period $T_R$ of the coil current $I_M$ during the cleaning process is greater than the period $T_S$ during the welding operation. This is because the current flowing through the arc 24 during the welding operation is higher in absolute value, and consequently experiences a greater force due to the magnetic field 50, 32, and moves faster from one end of the face 22 to the other end. Alternatively, the coil current $I_M$ might also vary in absolute value between the cleaning operation and the welding operation.

It will be understood that the cleaning operation described above is purely optional. In another embodiment, at time $t_4$ the welding current $I_S$ is switched on immediately, if a preliminary cleaning of the surfaces is not necessary.

Figures 10, 11:
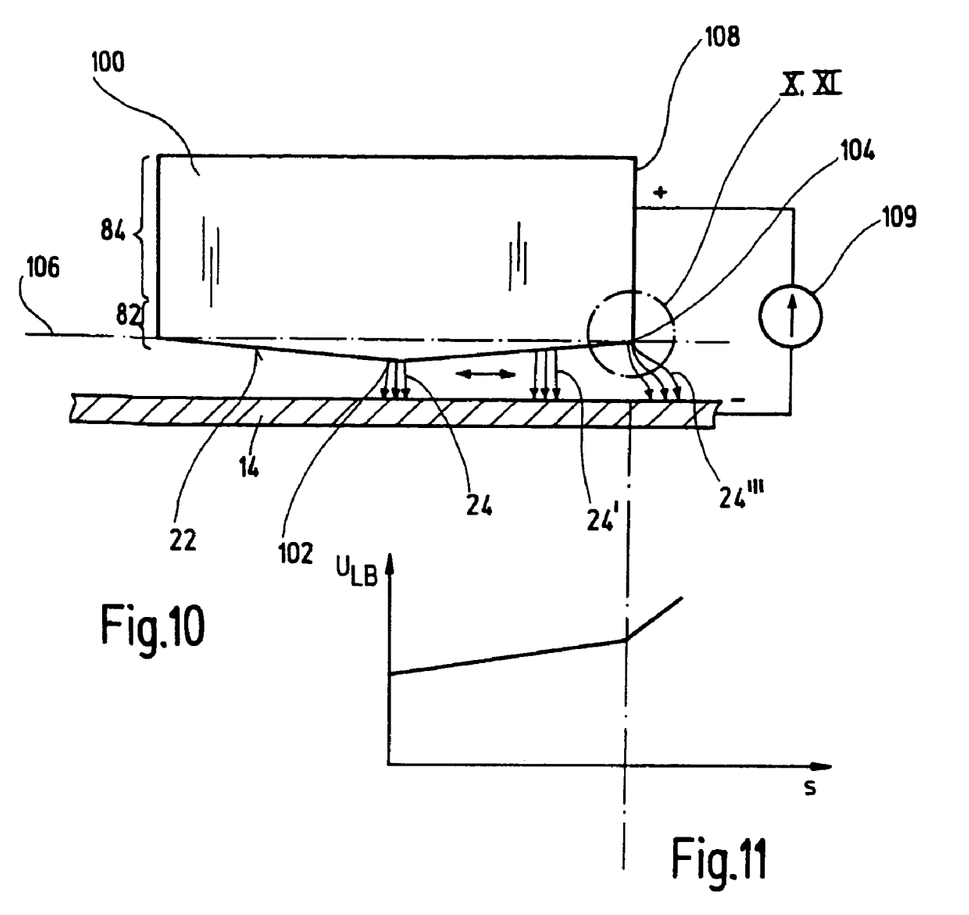
FIG. 10 is a schematic side view of a welding element to be butt welded onto a countersheet.
FIG. 11 is a graph, corresponding to the view in FIG. 10, of the arc voltage over the path of the arc.

FIG. 10, in schematic side view, shows a welding element in the form of a sheet 100 to be butt welded onto a counterpiece 14. Here the sheet 100 is shown at a slight distance from the counterpiece 14. The face 22 of the sheet 100 is of obtusely tapered configuration towards the center. The obtuse-angled point 102 thus formed is here arranged closest to the counterpiece 14. Starting from the point 102, the distance between the face 22 and the counterpiece 14 increases continuously towards the ends of the face, one of which is designated 104 in FIG. 10.

Owing to the configuration of the obtuse-angled point 102, in placement on the counterpiece 14 a defined point of contact is arranged, so that the arc 24, starting from the obtuse-angled point 102, can be drawn upon lifting of the sheet 100. The arc 24 then moves along the face, as shown at 24', as far as the end 104 of the face 22.

As reference for the contour of the counterpiece 104, in FIG. 10 a line 106 is drawn in, passing through the two ends 104 and rectilinearly configured. Owing to the conformation of the sheet in the neighborhood of the corner 104, and driven by the magnetic field 50, 32, the arc moves in the neighborhood of the corner 104 beyond the side edge 108 of the sheet 100, schematically indicated in FIG. 10 at 24'''.

In FIG. 11, the electric arc voltage $U_{LB}$ across the arc 24 is shown for each arc position. The arc voltage $U_{LB}$ gradually increases with increasing distance between the sheet 100 and the counterpiece 14. In the neighborhood of the corner 104, the arc voltage $U_{LB}$ then increases more sharply, since the arc once more suddenly lengthens considerably at 24'''. This rise in arc voltage $U_{LB}$ can be identified in the control device 60, as schematically shown at 109 in FIG. 10.

Owing to the sudden rise in arc voltage $U_{LB}$, it can be recognized that the arc 24 is in the neighborhood of the corner 104. On the basis of this information, the polarity of the magnetic field 50, 32 can then be reversed, so that the arc 24 will then be moved in the opposed direction. As soon as it has arrived at the opposed corner, this is again recognized by way of the arc voltage $U_{LB}$, the magnetic field 50, 32 is again reversed, and so on.

Figure 12:
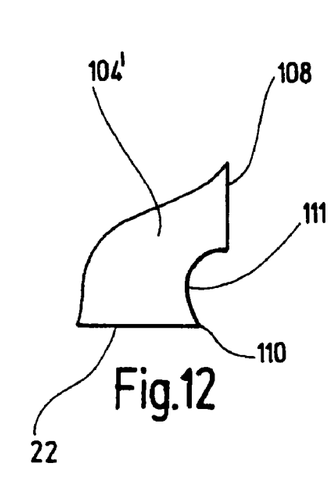
FIG. 12 is an elevational view of a preferred contour of the face of the welding element according to the invention in the neighborhood of an end of its face.
Figure 13:
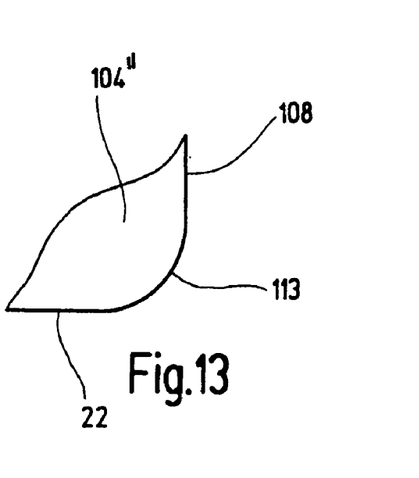
FIG. 13 is an elevational view of another embodiment of the contour of the face of the welding element, in the neighborhood of an end of its face.

By suitable configuration of the corner 104, it can be brought about that the arc voltage $U_{LB}$ is especially easy to detect in the neighborhood of the corner 104. Examples of the conformation of the corners 104 are shown in FIGS. 12 and 13. FIG. 12 shows a corner 104' provided with a recess 111 in the shape of a quarter-circle, more or less, forming an acute corner 110.

Another suitable embodiment of the corner is shown at 104" in FIG. 13. In this embodiment, the corner 104" is of rounded configuration from the face 22 as far as the side edge 108, as shown at 113 in FIG. 13.

What is claimed is:

1. An electric arc welding device operable to butt weld a metallic workpiece having an elongated face onto a metallic counterpiece, the device comprising:
   a magnetic field generating device operable to produce a magnetic field with the metallic workpiece oriented substantially transverse to the metallic counterpiece, the magnetic field generating device including:
      a pair of substantially U-shaped yokes each having an upper and a lower leg separated by a connection piece, the yokes positioned substantially mirror image about the metallic workpiece having the lower legs extending toward each other and the upper legs extending toward each other; and
      at least a first coil longitudinally and circumferentially looped about one of the connection pieces and oriented substantially parallel to the metallic workpiece;
   a voltage supply device connectable to the coil operably generating an electric arc between the elongated face of the workpiece and the counterpiece and substantially between the lower legs of the yokes; and
   a magnetic field component oriented transverse to a length of the elongated face and transverse to an electric arc length;
   wherein the electric arc operably moves in a direction of the length of the elongated face.

2. The device of claim 1, comprising:
a holding device operably holding the workpiece;
a reciprocating device operably moving the holding device both towards the counterpiece and away from it; and
a voltage of the voltage supply device operable to produce the electric arc.

3. The device of claim 1, comprising a control device operable to reverse a polarity of the magnetic field and to move the electric arc in each of two directions of the length of the elongated face.

4. The device of claim 1, comprising a size of the magnetic field produced by the magnetic field generating device operable to substantially cover the length of the elongated face.

5. The device of claim 1, comprising:
a second coil longitudinally and circumferentially looped about a second one of the connection pieces and oriented substantially parallel to both the metallic workpiece and the first coil; and
a magnetic circuit connectable to the first and second coils, having an air gap positionable adjacent to a welded seam to be formed;
wherein the elongated face of the workpiece is insertable between the air gap and the welded seam.

6. The device of claim 5, wherein the air gap is positionable between the lower legs of the yokes.

7. The device of claim 5, comprising:
a holding device operably holding the workpiece;
a ferromagnetic material of the workpiece; and
a non-ferromagnetic holding element of the holding device operably arranged in an air gap of the magnetic circuit, the magnetic circuit operable to generate the magnetic field.

8. An electric arc welding device, comprising:
a magnetic field generating device operable to produce a magnetic field, the magnetic field generating device including:
a pair of substantially U-shaped yokes each having opposed legs, the yokes oppositely positioned about a metallic workpiece, having the legs of one of the yokes facing the legs of the other yoke; and
individual ones of the legs of both of the yokes oriented substantially below an elongated face of the workpiece;
a workpiece holding device;
a reciprocating device connectable to the workpiece holding device, operable to translate the workpiece holding device through a range of positions including a workpiece arc generating position and a workpiece welding position; and
a welding voltage supply operably providing both an arc current and a welding current;
wherein in the workpiece arc generating position the arc current operably creates an electrical arc at the elongated face of the workpiece in an air gap between the workpiece and a proximately positioned counterpiece, and in the workpiece welding position the electrical arc is operably enhanced by the welding current to form a welding arc, the magnetic field being operable to longitudinally displace the welding arc.

9. The device of claim 8, comprising at least a first coil operably forming the magnetic field generating device.

10. The device of claim 9, wherein the first coil is positioned adjacent to a first one of the pair of yokes.

11. The device of claim 10, comprising a second coil positioned adjacent to a second one of the pair of yokes.

12. The device of claim 8, comprising:
a coil voltage supply connectable to the coil; and
a coil current generated by the coil voltage supply operable to generate the magnetic field.

13. A method for butt welding a metallic workpiece having an elongated face onto a metallic part, the method comprising:
orienting the metallic workpiece substantially transverse to the metallic part having the elongated face spaced by an air gap from the metallic part;
positioning a pair of substantially U-shaped yokes each having opposed legs oppositely about the metallic workpiece, having the legs of one of the yokes extending toward the legs of the other yoke, including having individual legs of both of the yokes positioned substantially below the elongated face and proximate to the air gap;
generating a magnetic field through both the U-shaped yokes and the metallic workpiece;
creating an electric arc in the air gap between the workpiece and the part;
positioning a component of the magnetic field transverse to an elongated dimension of the elongated face and transverse to an electric arc length; and
moving the electric arc in a welding operation along the elongated dimension of the elongated face.

14. The method of claim 13, comprising applying a voltage between the workpiece and the part to create the electric arc.

15. The method of claim 14, comprising:
butt-connecting the workpiece to the part; and
fusing the elongated face of the workpiece and a facing portion of the part to operably produce a welded seam.

16. The method of claim 14, comprising:
monitoring a voltage of the electric arc; and
initiating a pole reversal operation when the electric arc voltage indicates the electric arc reaches an end of the elongated face.

17. The method of claim 13, comprising:
moving the electric arc in a first direction;
reversing a polarity of the magnetic field when the electric arc reaches an end of the elongated face; and
moving the electric arc in a second direction opposite to the first direction.

18. The method of claim 13, comprising:
cleaning at least one surface of both the workpiece and the part prior to moving the electric arc in the welding operation, by the steps of:
applying a cleaning current having an absolute value smaller than an electric current absolute value; and
moving a cleaning electric arc along the surfaces using the magnetic field.

19. A method for butt welding a metallic sheet having an elongated face onto a metallic counterpiece, the method comprising:
positioning a pair of substantially U-shaped yokes each having opposed legs separated by a connecting member oppositely about the sheet, having the legs of one of the yokes facing the legs of the other yoke, including having individual ones of the legs of both yokes positioned substantially below the elongated face and proximate to the air gap;
generating a magnetic field through the U-shaped yokes and the sheet;

igniting an electric arc between the sheet and the counterpiece;
positioning a component of the magnetic field transverse to an extent of the elongated face and transverse to an extent of the electric arc; and
moving the electric arc to operably join the sheet to the counterpiece along the elongated face;
monitoring a voltage of the electric arc; and
reversing a welding direction when the voltage of the electric arc indicates the electric arc reaches an end of the elongated face.

20. The method of claim 19, comprising:
moving the electric arc in a first direction along the elongated face;
reversing a polarity of the magnetic field when the electric arc reaches a first end of the elongated face; and
moving the electric arc in a second direction opposite to the first direction until the electric arc reaches a second end of the elongated face.

* * * * *